(12) United States Patent
Schmidgall et al.

(10) Patent No.: US 11,975,924 B2
(45) Date of Patent: May 7, 2024

(54) CONVEYOR PULLEY APPARATUS, SYSTEMS, AND METHODS

(71) Applicant: Superior Industries, Inc., Morris, MN (US)

(72) Inventors: Paul Schmidgall, Morris, MN (US); Kent Olson, Morris, MN (US)

(73) Assignee: Superior Industries, Inc., Morris, MN (US)

( * ) Notice: Subject to any disclaimer, the term of this patent is extended or adjusted under 35 U.S.C. 154(b) by 47 days.

(21) Appl. No.: 17/634,075

(22) PCT Filed: Aug. 7, 2020

(86) PCT No.: PCT/US2020/045529
§ 371 (c)(1),
(2) Date: Feb. 9, 2022

(87) PCT Pub. No.: WO2021/030227
PCT Pub. Date: Feb. 18, 2021

(65) Prior Publication Data
US 2022/0348414 A1 Nov. 3, 2022

Related U.S. Application Data

(60) Provisional application No. 62/885,185, filed on Aug. 9, 2019.

(51) Int. Cl.
*B65G 39/02* (2006.01)

(52) U.S. Cl.
CPC ........ *B65G 39/02* (2013.01); *B65G 2201/042* (2013.01)

(58) Field of Classification Search
None
See application file for complete search history.

(56) References Cited

U.S. PATENT DOCUMENTS

| | | | |
|---|---|---|---|
| 2,218,817 A | 10/1940 | Frost | |
| 2,770,868 A * | 11/1956 | Streckfus | B65G 39/07 474/902 |
| 3,513,519 A | 5/1970 | Savela | |
| 4,673,380 A * | 6/1987 | Wagner | F16C 13/02 474/90 |
| 5,848,958 A * | 12/1998 | Damkjaer | B65G 39/02 492/38 |
| 6,508,115 B2 * | 1/2003 | Ingvarsson | B65H 27/00 73/862.55 |
| 6,691,615 B2 * | 2/2004 | Fukui | H04N 1/0692 101/409 |
| 9,440,796 B2 * | 9/2016 | Axmann | B65G 39/16 |

OTHER PUBLICATIONS

International Search Report and Written Opinion in International Application No. PCT/US2020/045529, dated Oct. 21, 2020, 10 pages.
International Preliminary Report on Patentability in International Application No. PCT/US2020/045529, dated Feb. 8, 2022, 5 pages.

* cited by examiner

*Primary Examiner* — Kavel Singh
(74) *Attorney, Agent, or Firm* — Todd R. Fronek; Larkin Hoffman Daly & Lindgren, Ltd.

(57) ABSTRACT

Conveyor pulley systems, methods and apparatus are disclosed. One or more embodiments include reinforcing structure which may comprise a cartridge. One or more embodiments include a backing bar and reinforcing disc with corresponding mounting structure.

18 Claims, 7 Drawing Sheets

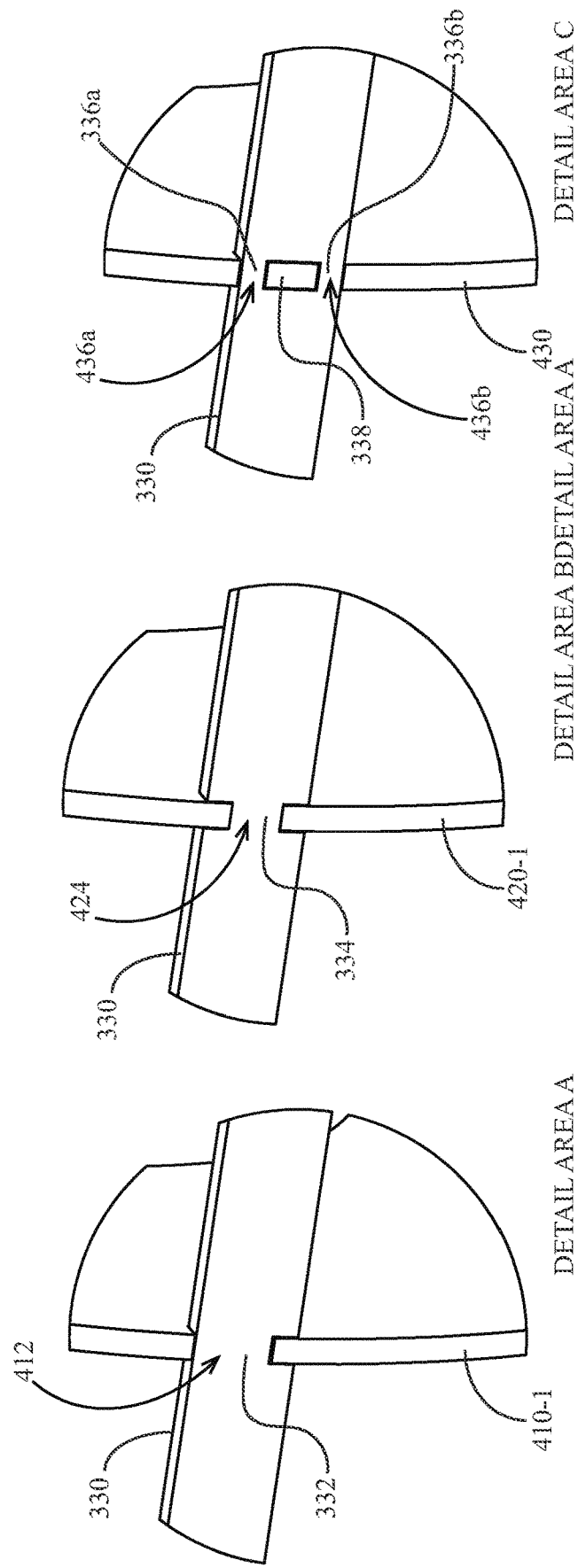

CONVEYOR PULLEY APPARATUS, SYSTEMS, AND METHODS

BACKGROUND

Conveyors are used to convey materials such as aggregate materials. Conveyor pulleys are used to support conveyor belts.

BRIEF DESCRIPTION OF THE DRAWINGS

FIG. 5 is an enlarged view of detail area A of FIG. 1B.

FIG. 6 is an enlarged view of detail area B of FIG. 1B.

FIG. 7 is an enlarged view of detail area C of FIG. 1B.

DESCRIPTION

Conveyor pulley apparatus, systems and methods are described herein. Some embodiments include an internal structure (e.g., cartridge) including backing bars and/or reinforcing discs. Some embodiments include backing bars and reinforcing discs with corresponding mounting structure.

Figure 1A:
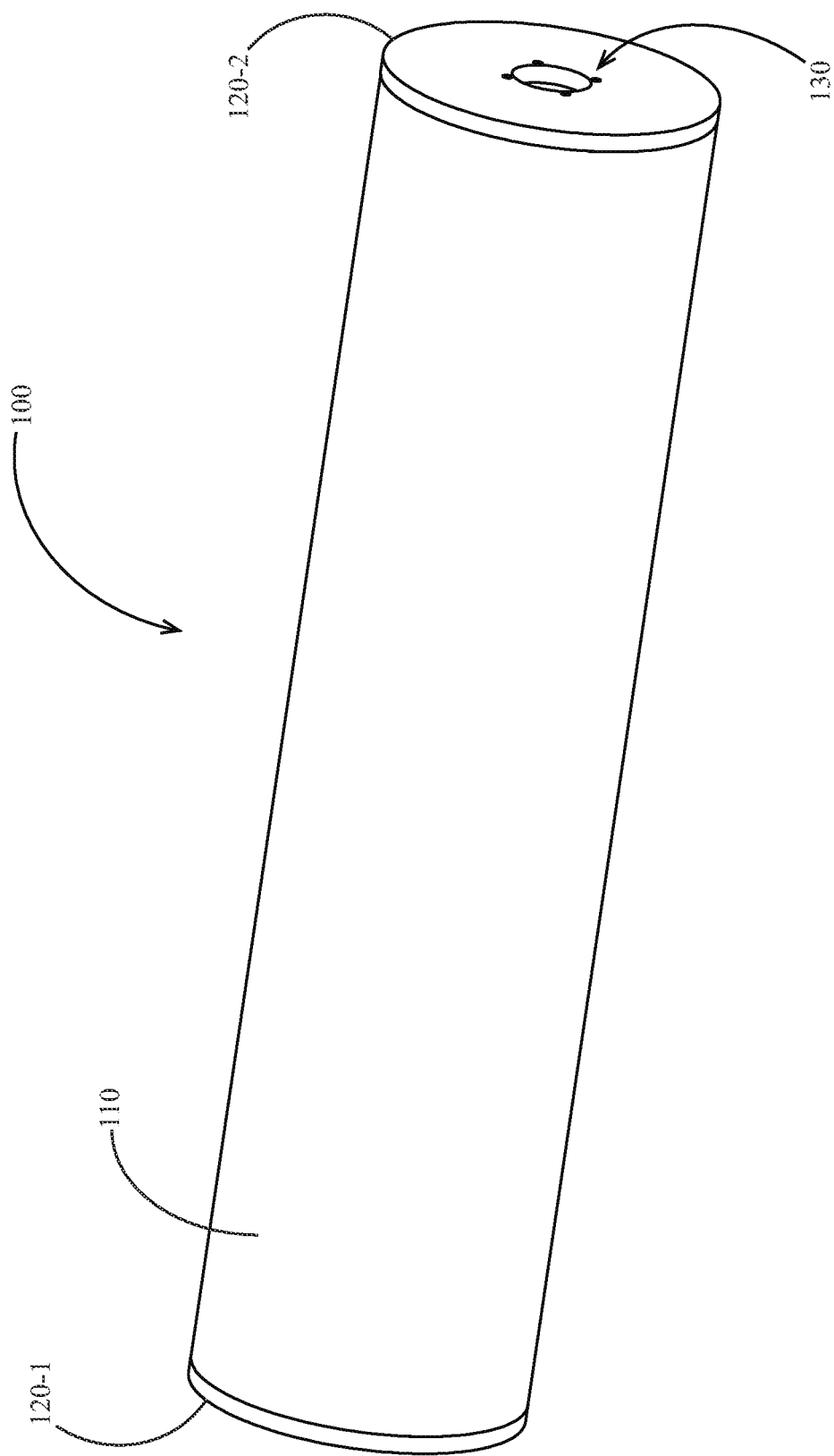
FIG. 1A is a perspective view of an embodiment of a conveyor pulley.

Referring to the drawings, wherein like reference numerals designate identical or corresponding parts throughout the several views, FIG. 1 illustrates an embodiment of a conveyor pulley 100 having a cylinder 110 and two end discs 120 which may be permanently or removably attached to the cylinder 110. The end discs 120 optionally include bearing supports 130 for supporting bearings 828 (see FIG. 8).

Figure 1B:
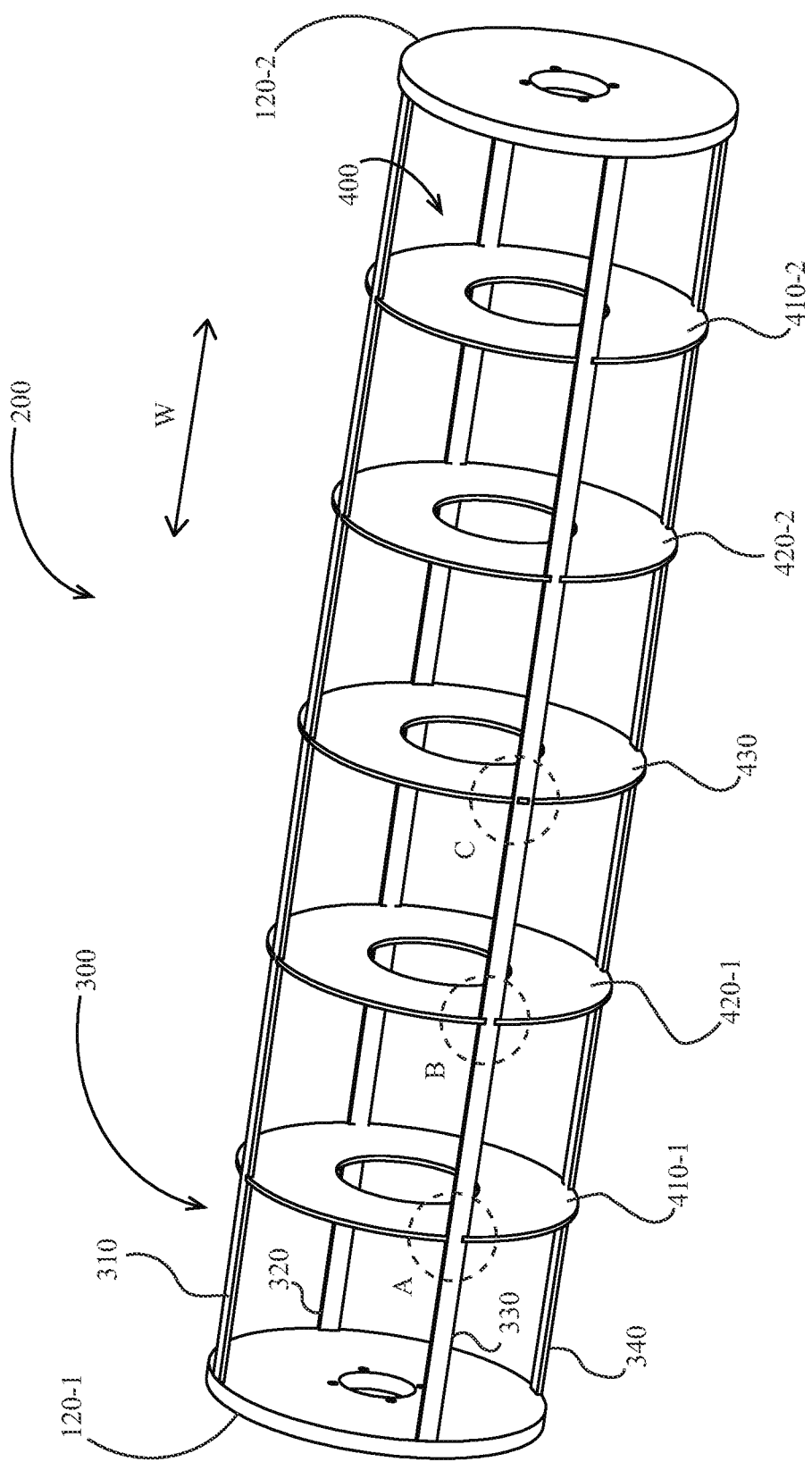
FIG. 1B is a perspective view of an embodiment of the conveyor pulley of FIG. 1B with a cylinder not shown.

Referring to FIG. 1B, in some embodiments the pulley includes a reinforcing structure 200 which may be described as a cartridge. The reinforcing structure optionally includes a set of reinforcing discs 400 (e.g., reinforcing discs 410-1, 410-2, 420-1, 420-2, 430. The reinforcing structure 200 optionally includes a set of backing bars 300 (e.g., backing bars 310, 320, 330, 340) mounted to (e.g., welded to) the reinforcing structure 200. In some embodiments, the reinforcing structure additionally includes end discs 120-1, 120-2 which are optionally mounted to opposing ends of the set of backing bars 300.

In some embodiments, the backing bars of the backing bar assembly 300 are connected (e.g., by welding) to the set of reinforcing discs 400. In some embodiments, the end discs 120-1, 120-2 are attached (e.g., by welding) to the opposing ends of the backing bar assembly 300.

Referring to FIGS. 5-7, in some embodiments one or more backing bars include corresponding mounting features. In some embodiments, the corresponding mounting features discourage and/or prevent improper assembly of the reinforcing structure 200. In some embodiments, the corresponding mounting features allow the temporary connection (e.g., prior to welding) of each reinforcing disc at a predetermined location along the width W of the set of backing bars 300.

For example, referring to FIG. 5 the disc 410-1 optionally includes a notch 412 corresponding to (e.g., sized to fit with) a narrowed portion 332 of backing bar 330. In some embodiments, discs 410-1 and 410-2 may be identical or substantially similar (e.g., having the same diameter, mounting features, etc.); a second narrowed portion 332 may be provided for attaching disc 410-2 to backing bar 330.

As another example, referring to FIG. 6 the disc 420-1 optionally includes a notch 424 corresponding to (e.g., sized to fit with) a narrowed portion 334 of backing bar 330. In some embodiments, discs 420-1 and 420-2 may be identical or substantially similar (e.g., having the same diameter, mounting features, etc.); a second narrowed portion 334 may be provided for attaching disc 420-2 to backing bar 330.

As another example, referring to FIG. 7 the disc 430 optionally includes notches 436a, 436b corresponding to (e.g., sized to fit with) portions 336a, 336b respectively of backing bar 330. In some embodiments, a tab 338 of disc 430 fits an opening in the backing bar 330 (e.g., between portions 336a, 336b).

In some embodiments, the other backing bars of the set of backing bars 300 may have other similar and/or different mounting features (e.g., tabs, slots, narrowed portions, openings, etc.) corresponding to mounting features at corresponding radial positions on the reinforcing discs.

It should be appreciated that in various embodiments, not all of the reinforcing discs are of the same diameter, such that the reinforcing discs are not generally interchangeable unless otherwise stated herein. In some embodiments, the diameters of two reinforcing discs may differ by a relatively small amount (e.g., less than 20%, less than 10%, less than 5%, etc.) such that it may not be visually apparent during installation which reinforcing disc should be installed at which location in the reinforcing structure. Thus, in some embodiments the corresponding mounting features on the backing bar and reinforcing disc may advantageously aid the assembler in locating each reinforcing disc at the appropriate position along the backing bar assembly.

Figure 2:
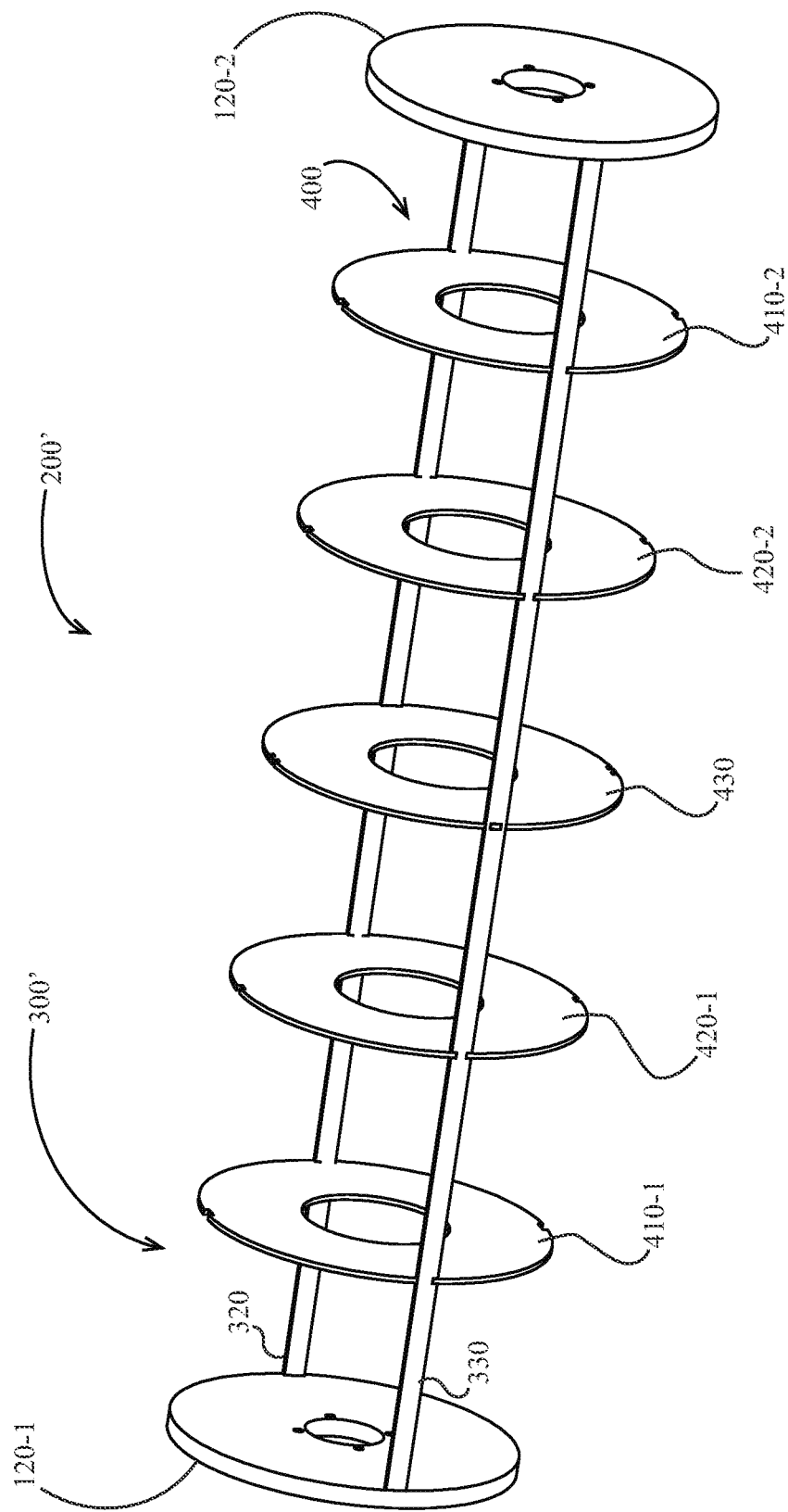
FIG. 2 is a perspective view of an embodiment of a conveyor pulley cartridge.

An alternative embodiment of a reinforcing structure 200' is illustrated in FIG. 2 having a backing bar assembly 300' with only two backing bars 320, 330. The backing bars 320, 330 are optionally disposed on opposing sides of the structure 200'. It should be appreciated that various embodiments may include various numbers and/or positions of backing bars.

Figure 3:
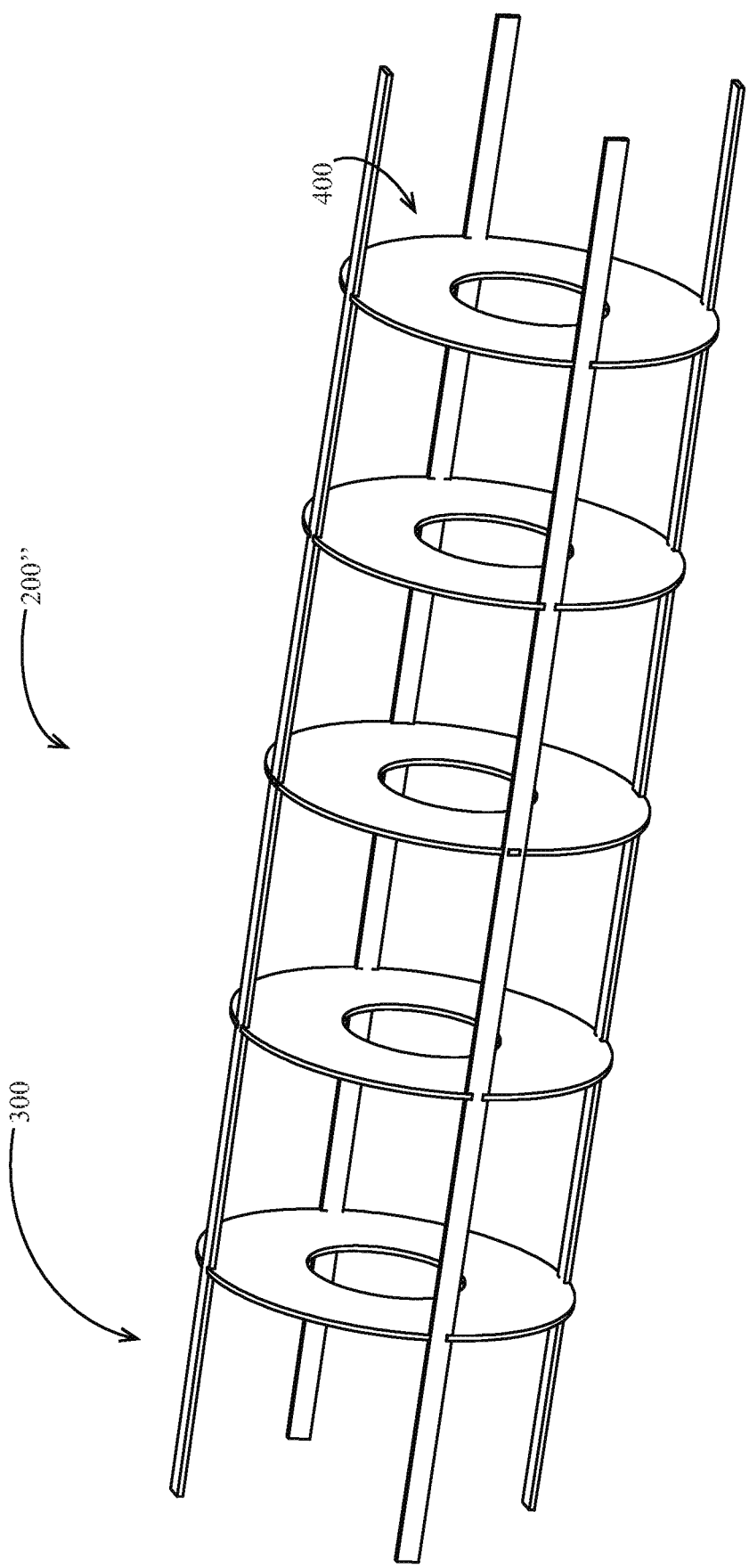
FIG. 3 is a perspective view of another embodiment of a conveyor pulley cartridge.
Figure 4:
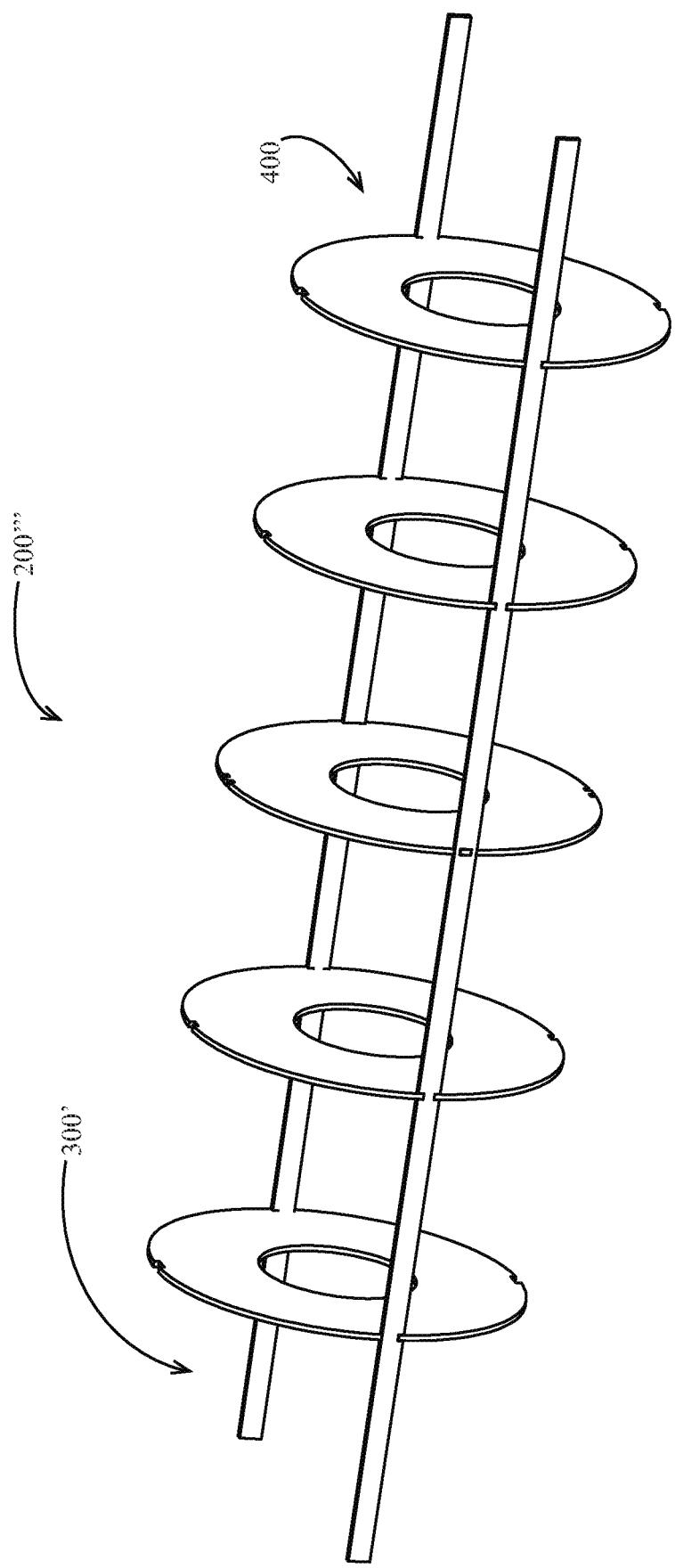
FIG. 4 is a perspective view of another embodiment of a conveyor pulley cartridge.

An alternative embodiment of a reinforcing structure 200" is illustrated in FIG. 3 without one or more end discs. In some implementations, one or more end discs may be attached (e.g., welded) to the ends of the backing bar assembly 300 during installation.

An alternative embodiment of a reinforcing structure 200'" is illustrated in FIG. 3 without one or more end discs and having a backing bar assembly 300' including only two backing bars. In some implementations, one or more end discs may be attached (e.g., welded) to the ends of the backing bar assembly 300 during installation.

In some methods of constructing various embodiments described herein, the reinforcing structure 200 may be inserted into the cylinder 110 before or after attaching end discs 120 to the reinforcing structure. In some embodiments, the reinforcing discs may be inserted into the cylinder axially (e.g., through the open end of cylinder 110). In some embodiments, the cylinder 110 may comprise two half-cylindrical halves divided by an plane parallel to the width W of the cylinder; in some such embodiments, the reinforcing structure 200 may be inserted into a first half of the cylinder before attaching (e.g., welding) the second half of the cylinder to the first half of the cylinder. In some embodiments, the cylinder 110 may comprise first and second halves divided by a plane perpendicular to the width W of the cylinder; in some such embodiments, the reinforcing structure 200 may be inserted into the reinforcing structure 200 may be inserted into a first half of the cylinder before attaching (e.g., welding) the second half of the cylinder to the first half of the cylinder.

Figure 8:
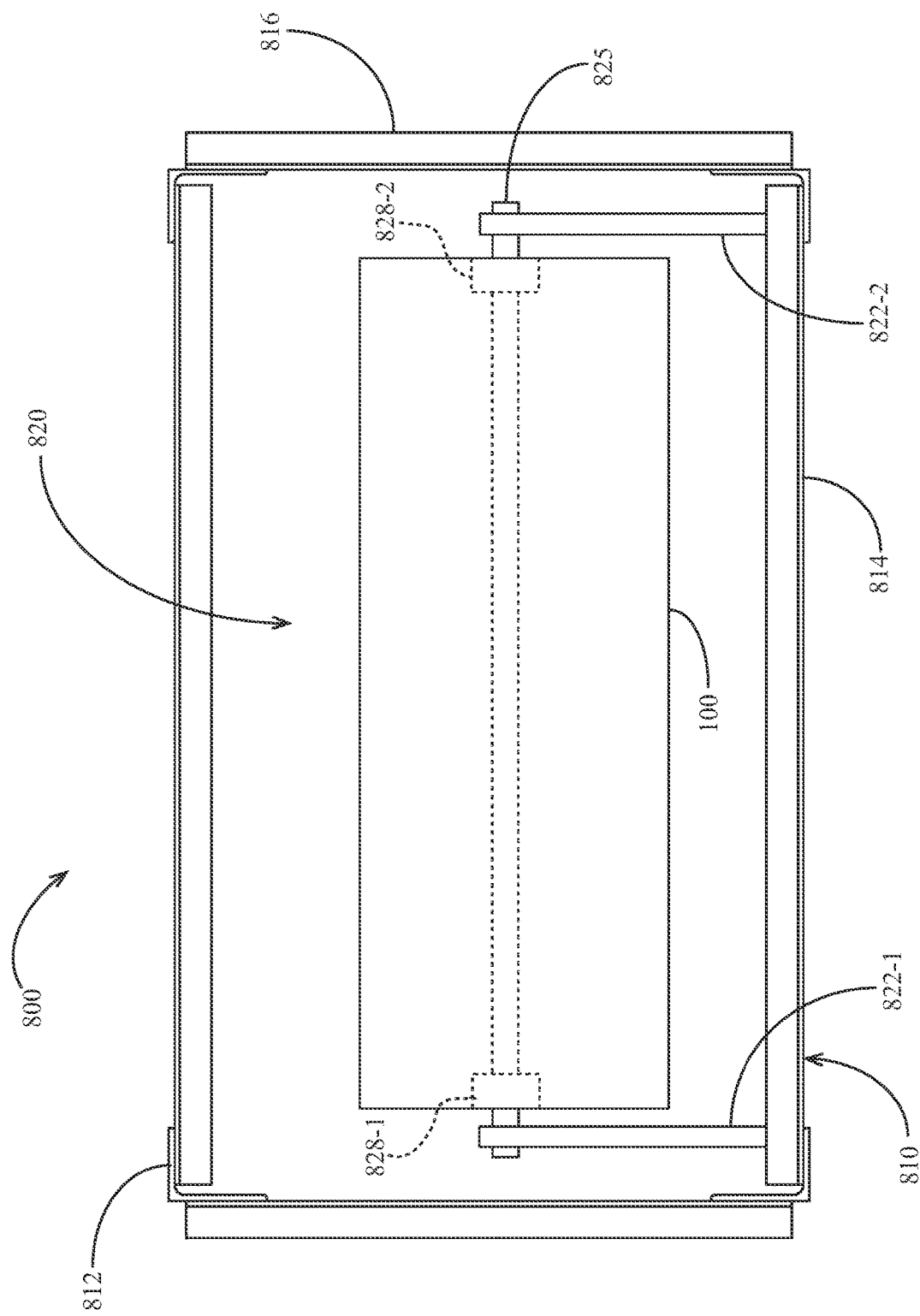
FIG. 8 is a sectional view of a conveyor incorporating the pulley of FIG. 1A.

Referring to FIG. 8, the pulley 100 may be included in a pulley assembly 820 in which the pulley 100 is rollingly supported on a shaft 825 by bearings 828-1, 828-2. The shaft 825 is optionally supported on opposing ends by first and second end stands 822-1, 822-2. The end stands 822-1, 822-2 are optionally supported on a cross-member 814 which is optionally one of several cross-members members of a support assembly 810. The cross-members are optionally mounted (e.g., by welding) to longitudinally extending rails 812 which are optionally reinforced by lattice members 816.

The pulley 100 may be located at any suitable location along a conveyor 800 (e.g., at a head end thereof, at a medial location thereof, etc.). The pulley 100 may comprise a head pulley, drive pulley, tail pulley, take-up pulley, snub pulley, or other pulley of the conveyor 800.

The pulley 100 may comprise a straight face pulley, convex crown pulley, concave crown pulley, flat pulley, etc. The outer surface of cylinder 110 may be provided with any suitable type of lagging (e.g., rubber, ceramic, etc.) or other features.

Although various embodiments have been described above, the details and features of the disclosed embodiments are not intended to be limiting, as many variations and modifications will be readily apparent to those of skill in the art. Accordingly, the scope of the present disclosure is intended to be interpreted broadly and to include all variations and modifications within the scope and spirit of the appended claims and their equivalents. For example, any feature described for one embodiment may be used in any other embodiment.

The invention claimed is:

1. A conveyor pulley, comprising:
    a cylinder;
    a plurality of backing bars sized to be received within said cylinder, said plurality of backing bars having a first set of mounting features formed therein, each mounting feature of said first set of mounting features comprising a tab or a notch formed in one of said backing bars; and
    a plurality of reinforcing discs sized to be received within said cylinder, said plurality of reinforcing discs having a second set of mounting features formed therein and corresponding to said first set of mounting features, each mounting feature of said first set of mounting features comprising a tab or notch formed in one of said reinforcing discs, wherein each of said second set of mounting features are disposed at a radially outer edge of each reinforcing disc, each backing bar being mounted to each reinforcing disc at said radially outer edge, wherein each mounting feature of said first set of mounting features is configured to engage with a corresponding mounting feature of said second set of mounting features.

2. The conveyor pulley of claim 1, wherein said first and second sets of mounting features are configured to prevent incorrect installation of said plurality of reinforcing discs.

3. The conveyor pulley of claim 1, wherein said plurality of reinforcing discs includes a first type of reinforcing disc and a second type of reinforcing disc, wherein said first set of mounting features of said backing bars includes a first type of mounting feature at a first location along a width of said backing bars such that a first type of reinforcing disc is mountable at said first location and such that said second type of reinforcing disc is not mountable at said first location.

4. The conveyor pulley of claim 3, wherein said first set of mounting features of said backing bars includes a second type of mounting feature at a second location along a width of said backing bars such that a second type of reinforcing disc is mountable at said second location and such that said first type of reinforcing disc is not mountable at said second location.

5. The conveyor pulley of claim 4, further comprising:
    first and second end discs mounted to opposing ends of said backing bars.

6. The conveyor pulley of claim 1, further comprising:
    first and second end discs mounted to opposing ends of said backing bars.

7. The conveyor pulley of claim 1, wherein said backing bars and said reinforcing discs are configured to be assembled into a partially assembled configuration, wherein in said partially assembled configuration said backing bars and said reinforcing discs are insertable into said cylinder.

8. A conveyor pulley, comprising:
    a cylinder; and
    a cartridge insertable in said cylinder, said cartridge comprising:
    a plurality of backing bars having a first set of mounting features; and
    a plurality of reinforcing discs having a second set of mounting features, each reinforcing disc of said second set of mounting features comprising a tab or notched formed in said reinforcing disc, each tab or notch corresponding to one of said first set of mounting features, wherein each of said second set of mounting features are disposed at a radially outer edge of each reinforcing disc, each backing bar being mounted to each reinforcing disc at said radially outer edge.

9. The conveyor pulley of claim 8, wherein said plurality of reinforcing discs includes a first type of reinforcing disc and a second type of reinforcing disc, wherein said first set of mounting features of said backing bars includes a first type of mounting feature at a first location along a width of said backing bars such that a first type of reinforcing disc is mountable at said first location and such that said second type of reinforcing disc is not mountable at said first location.

10. The conveyor pulley of claim 9, wherein said first set of mounting features of said backing bars includes a second type of mounting feature at a second location along a width of said backing bars such that a second type of reinforcing disc is mountable at said second location and such that said first type of reinforcing disc is not mountable at said second location.

11. The conveyor pulley of claim 10, wherein each mounting feature of said first set of mounting features comprises a tab or a notch.

12. The conveyor pulley of claim 8, wherein each mounting feature of said first set of mounting features comprises a tab or a notch.

13. A method of assembling a conveyor pulley, comprising:
    assembling a cartridge comprising a backing bar assembly having a plurality of backing bars and a set of reinforcing discs by aligning a tab or notch formed in a backing bar of the backing bar assembly with a tab or notch formed in a reinforcing disc of the set of reinforcing discs and placing the plurality of backing bars at radially outer edges of the reinforcing discs; and inserting said cartridge into a cylinder.

14. The method of claim 13, further comprising:

attaching a first end disc to a first end of said cartridge; and attaching a second end disc to a second end of said cartridge.

15. The method of claim 13, further comprising:

attaching a first end disc to a first end of said backing bar assembly; and attaching a second end disc to a second end of said backing bar assembly.

16. The method of claim 13, further comprising:

attaching a first end disc to a first end of said cylinder; and attaching a second end disc to a second end of said cylinder.

17. The method of claim 13, further comprising:

welding said cartridge to said cylinder; and attaching first and second end discs to one of said cartridge and said cylinder.

18. The method of claim 13, further comprising:

before inserting said cartridge into said cylinder, attaching first and second end discs to said cartridge.

* * * * *